(12) United States Patent
Chassard et al.

(10) Patent No.: US 9,071,177 B2
(45) Date of Patent: Jun. 30, 2015

(54) METHOD FOR CONTROLLING THE RESISTING TORQUE OF A MOTOR VEHICLE ALTERNATOR, AND SYSTEM FOR IMPLEMENTING THIS METHOD

(75) Inventors: Pierre Chassard, Creteil (FR); Pierre Tisserand, Limeil-brevannes (FR); Laurent Labiste, Saint Maur des Fosses (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 52 days.

(21) Appl. No.: 14/119,667

(22) PCT Filed: Apr. 27, 2012

(86) PCT No.: PCT/FR2012/050941
§ 371 (c)(1),
(2), (4) Date: Jan. 17, 2014

(87) PCT Pub. No.: WO2012/168605
PCT Pub. Date: Dec. 13, 2012

(65) Prior Publication Data
US 2014/0125296 A1     May 8, 2014

(30) Foreign Application Priority Data

Jun. 8, 2011   (FR) ..................... 11 54976

(51) Int. Cl.
| H02P 11/00 | (2006.01) |
| H02H 7/06 | (2006.01) |
| H02P 9/00 | (2006.01) |
| H02P 9/08 | (2006.01) |
| H02P 9/48 | (2006.01) |
| H02P 9/10 | (2006.01) |
| H02P 9/14 | (2006.01) |
| H02P 101/45 | (2015.01) |

(52) U.S. Cl.
CPC ........ *H02P 9/08* (2013.01); *H02P 9/107* (2013.01); *H02P 9/48* (2013.01); *H02P 2101/45* (2015.01)

(58) Field of Classification Search
USPC .............................................. 322/22, 28, 59
See application file for complete search history.

(56) References Cited

U.S. PATENT DOCUMENTS 4,348,620 A * 9/1982 Simon .......................... 318/154
4,362,982 A * 12/1982 Akita et al. ................... 320/123
(Continued)

FOREIGN PATENT DOCUMENTS

| DE | 102004020730 | 11/2004 |
| DE | 102006003425 | 8/2006 |
| DE | 102006019625 | 11/2006 |

*Primary Examiner* — Pedro J Cuevas
(74) *Attorney, Agent, or Firm* — Berenato & White, LLC

(57) ABSTRACT

A method is disclosed to produce a supply voltage (B+) in an on-board system of a vehicle in response to an excitation current (I_ROTOR) applied to a rotor of the alternator. The method is of the type that consists in: limiting the resisting torque by determining a maximum cyclic ratio (DC_C_LIMIT) of the excitation current as a function of variables taken from a group containing a rotational speed (V_ROTOR) of the rotor, a temperature of the rotor, the excitation current and the supply voltage (B+). The maximum cyclic ratio is determined as a function of at least two of the variables in the group. According to one specific embodiment, the variables are rotational speed and temperature. According to another embodiment, the variables are rotational speed and excitation current.

7 Claims, 3 Drawing Sheets

(56) References Cited

U.S. PATENT DOCUMENTS

| | | | |
|---|---|---|---|
| 4,385,270 A * | 5/1983 | Balan et al. | 322/23 |
| 4,386,310 A * | 5/1983 | Sievers | 322/28 |
| 4,417,194 A * | 11/1983 | Curtiss et al. | 322/47 |
| 6,534,959 B1 * | 3/2003 | Anderson et al. | 322/28 |
| 6,909,262 B2 * | 6/2005 | Yao et al. | 322/28 |
| 7,038,406 B2 * | 5/2006 | Wilson | 318/140 |
| 7,224,148 B2 * | 5/2007 | Watanabe et al. | 322/59 |
| 7,292,007 B2 * | 11/2007 | Aoyama | 322/24 |
| 7,391,186 B2 * | 6/2008 | Asada | 322/28 |
| 7,528,585 B2 * | 5/2009 | Maehara | 322/59 |
| 7,602,153 B2 * | 10/2009 | Steiner | 322/59 |
| 7,683,588 B2 * | 3/2010 | Maehara | 322/28 |
| 7,759,909 B2 * | 7/2010 | Graovac et al. | 322/59 |
| 8,749,205 B2 * | 6/2014 | Sasaki et al. | 322/24 |
| 8,773,081 B2 * | 7/2014 | Akita et al. | 322/28 |
| 2003/0042874 A1 * | 3/2003 | Anderson et al. | 322/28 |
| 2003/0085691 A1 * | 5/2003 | Yao et al. | 322/28 |
| 2004/0155632 A1 * | 8/2004 | Wilson | 322/28 |
| 2006/0091864 A1 * | 5/2006 | Watanabe et al. | 322/28 |
| 2006/0181248 A1 * | 8/2006 | Aoyama | 322/28 |
| 2007/0085510 A1 * | 4/2007 | Asada | 322/28 |
| 2007/0085512 A1 | 4/2007 | Maehara | 322/28 |
| 2007/0247119 A1 * | 10/2007 | Maehara | 322/28 |
| 2008/0116858 A1 * | 5/2008 | Steiner | 322/25 |
| 2009/0039838 A1 * | 2/2009 | Maehara | 322/19 |
| 2012/0146593 A1 * | 6/2012 | Akita et al. | 322/10 |
| 2012/0153904 A1 * | 6/2012 | Albsmeier | 322/28 |
| 2012/0176100 A1 * | 7/2012 | Tisserand et al. | 322/24 |
| 2012/0298062 A1 * | 11/2012 | Granziera | 123/179.3 |
| 2014/0316679 A1 * | 10/2014 | Nishida et al. | 701/104 |
| 2014/0340055 A1 * | 11/2014 | Tisserand et al. | 322/19 |
| 2014/0368171 A1 * | 12/2014 | Maehara | 322/59 |

\* cited by examiner

METHOD FOR CONTROLLING THE RESISTING TORQUE OF A MOTOR VEHICLE ALTERNATOR, AND SYSTEM FOR IMPLEMENTING THIS METHOD

CROSS-REFERENCE TO RELATED APPLICATIONS AND CLAIM TO PRIORITY

This application is a national stage application of International Application No. PCT/FR2012/050941 filed Apr. 27, 2012, which claims priority to French Patent Application No. 11/54976 filed Jun. 8, 2011, of which the disclosures are incorporated herein by reference and to which priority is claimed.

TECHNICAL SCOPE OF THE INVENTION

This invention relates to a process for controlling the resistant torque of an alternator intended to be coupled to a motor vehicle internal combustion engine. The invention also relates to a system for controlling this resistant torque through implementing this process, as well as an alternator comprising this system.

TECHNICAL BACKGROUND TO THE INVENTION

In the field of motor vehicles it is well known that the voltage supplied to the on-board electrical system can be maintained at a predetermined set value by means of a regulating device known as a "regulator", independently of the rotation speed of the engine or the electrical consumption of the equipment.

At the present time motor vehicle equipment manufacturers have developed very high performance alternators using electronic power systems controlled by circuits using digital techniques, based in particular on the use of wired logic, microprocessors or microcontrollers.

Unlike former two-blade regulators which operated around a fixed regulated voltage regardless of the manner in which the vehicle was functioning, modern electronic regulation devices make use of electronic signal processing capabilities to receive variable set values transmitted by an engine control unit in order to optimise battery charge and generation of the electricity required for electronic equipment in relation to torque.

It is envisaged that the alternator should not draw torque when the engine is started, or when accelerating, in order to improve the performance of vehicles of small cylinder capacity, or chat the torque drawn may be further reduced because the battery is already loaded.

It is known that the resistant torque drawn by an alternator can be limited by a progressive load function known as "LRC" (acronym for the English phrase "Load Response Control").

In particular the LRC function prevents the internal combustion engine from stopping when it is idling or cold, when the vehicle is starting, and when major electrical loads are connected to the on-board electrical system.

Without the LRC function connection of these loads would cause the voltage regulator of the PWM ("Pulse Width Modulation") type to increase the duty cycle with as a consequence an increase in the excitation current feeding the alternator rotor, and as a result increasing the resistant torque.

The LRC function generally limits this duty cycle on the basis of variables such as the rotation speed of the engine (i.e. of the thermal combustion engine), or the temperature, or the excitation current, or the feed voltage.

For example, the process of progressively controlling the load on a motor vehicle alternator disclosed in European patent application EP2259421 defines the maximum permitted value for the duty cycle in relation to an alternator rotation speed.

However the ways in which the LRC function is implemented known in the state of the art, which take into account only one decision variable, have weakness in some situations, for example when it is not desired to exceed a torque value.

GENERAL DESCRIPTION OF THE INVENTION

As a consequence the object of this invention is to overcome this weakness by taking combinations of these variables into account.

In a first aspect, the invention relates to a process for controlling the resistant torque of a motor vehicle alternator designed to be coupled to the internal combustion engine of a vehicle which is capable of producing a feed voltage for a system on board the vehicle in response to an excitation current applied to an alternator rotor, the process being of the type of those comprising limiting the resistant torque by determining a maximum duty cycle for the excitation current according to variables taken from a group comprising a rotation speed of the rotor, a temperature of the rotor, the excitation current and the feed voltage.

According to the invention the maximum duty cycle is determined on the basis of at least rotation speed and temperature, the maximum duty cycle being a linear function of the temperature, with a gradient which is inversely proportional to the rotation speed.

According to a particular feature of the process, temperature is estimated on the basis of a measurement of the temperature of a voltage regulator, preferably the junction temperature of a semiconductor unit switching the excitation current.

According to a second aspect the invention relates to a system for controlling the resistant torque of a motor vehicle alternator capable of implementing the process briefly described below, the alternator being designed to be coupled to the internal combustion engine of a vehicle and producing a feed voltage to a system on board the vehicle in response to an excitation current flowing in a rotor of the alternator, the system being of the type of those comprising limiting the resistant torque and comprising:
  a signal generator controlling the excitation current and having a variable duty cycle which is not greater than a maximum duty cycle;
  measurement means from a first group comprising means for measuring the rotation speed of the rotor, means for measuring the temperature of the rotor, means for measuring the excitation current and means for measuring the feed voltage; and
  means for determining the maximum duty cycle from the measured results provided by the measurement means.

According to the invention the determining means determine the maximum duty cycle in relation to at least rotation speed and temperature, this maximum duty cycle being equal to a linear function of the temperature, with a gradient which is inversely proportional to the said rotation speed.

According to a special feature of the system, the determining means also comprise a torque estimating unit and a unit controlling limiting of the excitation.

According to other special features the torque estimating unit comprises at least one processing unit among a second group comprising an amplifier, a filter, a multiplier, a mapper, a subtractor and a binary word length adaptor, and the excitation limitation control unit comprises a limiter limiting the duty cycle.

According to yet another special feature, the determining means further comprise a memory function including instructions representative of the process described above.

According to another feature the invention also relates to a motor vehicle alternator comprising a system for controlling a resistant torque having the above characteristics.

These essential specifications will have clarified the advantages provided by the process for controlling a resistant torque of a motor vehicle alternator according to the invention, together with the control system and the corresponding alternator, for a person skilled in the art in comparison with the prior state of the art.

Detailed specifications of the invention are provided in the following description in association with the appended drawings. It should be noted that the purpose of these drawings is only to illustrate the text of the description and that they do not in any way constitute a limitation on the scope of the invention.

DESCRIPTION OF PREFERRED
EMBODIMENTS OF THE INVENTION

As already mentioned in the preamble, several solutions for limiting the resistant torque C drawn from the internal combustion engine of a motor vehicle by the alternator are known in the state of the art.

A first solution comprises establishing a first duty cycle limitation SPEED_LIMIT in relation to the rotation speed V_ROTOR of the alternator, which is estimated from a period of a phase signal.

Figure 1A:
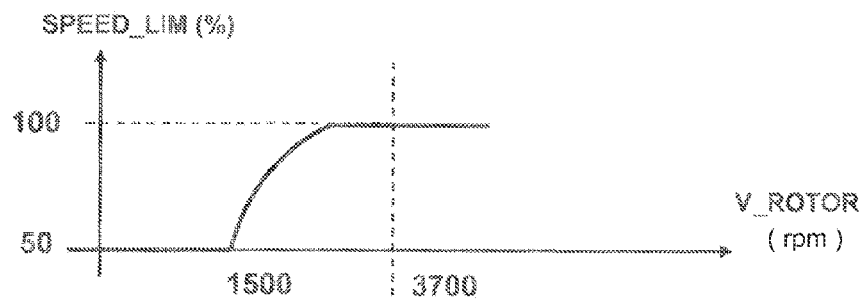
FIG. 1a is a graph showing a first limitation of the duty cycle of an excitation current in relation to the rotation speed of a rotor of an alternator known in the state of the art.

FIG. 1a provides an example in which the maximum duty cycle DC_LIMIT is 50% for a rotation speed V_ROTOR of less than 1500 rpm, which becomes 100% towards 3700 rpm.

This first duty cycle limitation SPEED_LIMIT makes it possible to avoid the risk of stopping when idling.

A second known solution comprises establishing a second limitation on the duty cycle, TEMP_LIMIT, on the basis of the temperature T_ROTOR of the alternator rotor. The temperature T_ROTOR may be a temperature estimated on the basis of a measurement of the temperature of the alternator voltage regulator, preferably the temperature at the junction of a MOS semiconductor switching unit for the excitation current I_ROTOR of the alternator.

Figure 1B:
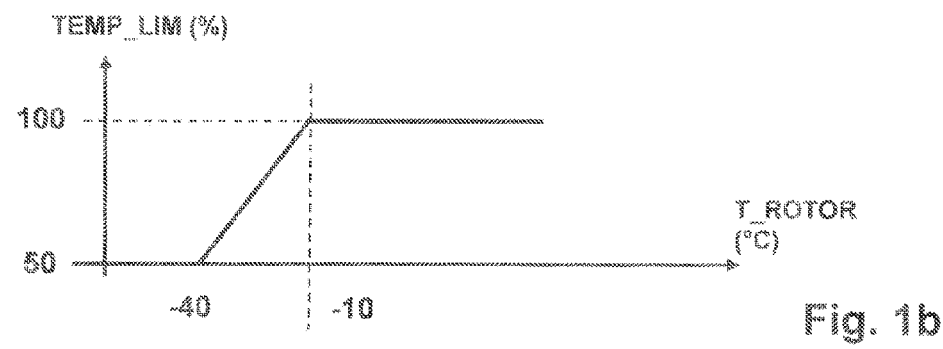
FIG. 1b is a graph showing a second limitation of the duty cycle in relation to the temperature of a rotor known in the state of the art.

FIG. 1b provides an example in which the maximum duty cycle DC_LIMIT is 50% for a T_ROTOR temperature of less than −40° C., which becomes 100% towards a T_ROTOR temperature of −10° C.

This second limitation on the duty cycle TEMP_LIMIT makes it possible to avoid the risk of stopping when starting at very low temperature.

However implementation of one or other of these solutions gives rise to a weakness:
  if the first solution is used alone, the internal combustion engine may be started and the maximum duty cycle DC_LIMIT may be close to 100%, according to the graph in FIG. 1a, whereas the engine environment is still cold. In this case the low resistance of the rotor (see FIG. 5) will result in a maximum excitation current and therefore a maximum drawn torque C,
  if the second solution is used alone, no provision is made for idling from a T_ROTOR temperature of more than −10° C.

The process according to the invention overcomes this weakness by combining the first and second duty cycle limitations SPEED_LIMIT, TEMP_LIMIT.

A simple combination comprises taking the maximum duty cycle DC_LIMIT to be equal to the largest of the first and second duty cycle limitations SPEED_LIMIT, TEMP_LIMIT:

DC_LIMIT=MAX(SPEED_LIMIT,TEMP_LIMIT)

Measurements made on a prototype alternator have shown that:
  the resistant torque C when cold (from −40° C. to −20° C.) at a low V_ROTOR speed (approximately 2000 rpm) is effectively limited;
  there is no limitation either when hot or at high speed.

Another simple combination comprises taking the maximum duty cycle DC_LIMIT to be equal to the mean of the first and second duty cycle limitations SPEED_LIMIT, TEMP_LIMIT:

DC_LIMIT=MEAN(SPEED_LIMIT,TEMP_LIMIT)

Measurements made on this same prototype alternator have established that:
  the resistant torque C when cold (from −40° C. to −20° C.) at low speed (approximately 2000 rpm) will effectively be limited;
  there is average limitation when hot and at low speed;
  there is no limitation when hot and at high speed.

Figure 2:
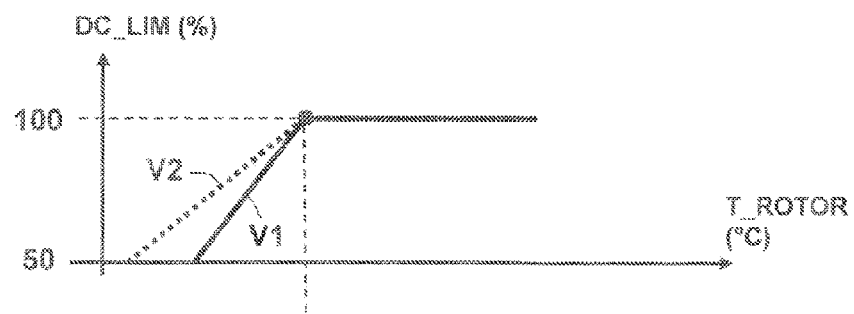
FIG. 2 is a graph showing a maximum duty cycle in relation to rotor temperature and rotation speed according to the invention.

A more complex combination comprises varying the gradient of the second duty cycle limitation TEMP_LIMIT in relation to the T_ROTOR temperature (FIG. 1b) which is inversely proportional to the rotation speed V_ROTOR, as shown for example in FIG. 2:
  for a speed V1 of 1500 rpm the gradient of the maximum duty cycle DC_LIMIT is 50/25=2;
  for a speed V2 of 2000 rpm the gradient of the maximum duty cycle DC_LIMIT is 50/30=1.7.

The maximum duty cycle DC_LIMIT is calculated using a linear function of temperature T_ROTOR whose gradient is inversely proportional to the rotation speed V_ROTOR (a and b are two predetermined constants):

$$DC\_LIMIT = (a/V\_ROTOR) \cdot T\_ROTOR + b$$

Measurements also made on the prototype alternator have shown that:
- a resistant torque C when cold (from −40° C. to −20° C.) at low speed (approximately 2000 rpm) is effectively limited;
- the resistant torque which is linearly controlled through the temperature T_ROTOR and the reciprocal of the rotation speed V_ROTOR is limited;
- there is no limitation when hot and at high speed.

Figure 3:
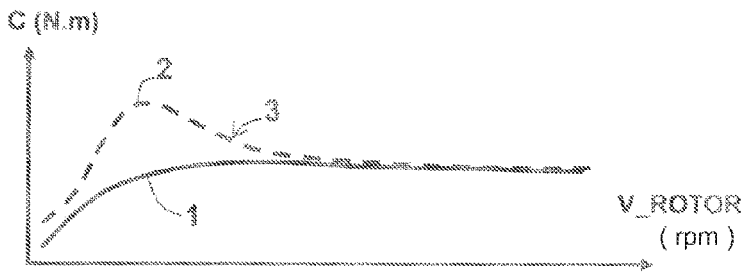
FIG. 3 shows the effect of applying limitation to the duty cycle according to the graph in FIG. 2 on the torque drawn.

FIG. 3 shows the effect of implementing a duty cycle limitation: graph 1 of the resistant torque C in relation to rotation speed V_ROTOR shows no maximum 2 on slowing in the case where a load such as that present in the graph without limiting function 3 is connected.

In a first variant of the process for controlling the resistant torque C of a motor vehicle alternator according to the invention the variable associated with rotation speed V_ROTOR for calculating the maximum duty cycle DC_LIMIT is the excitation current I_ROTOR flowing in the rotor. The measurement may for example be made when the semiconductor unit switching this current is in a passing state.

Figure 4:
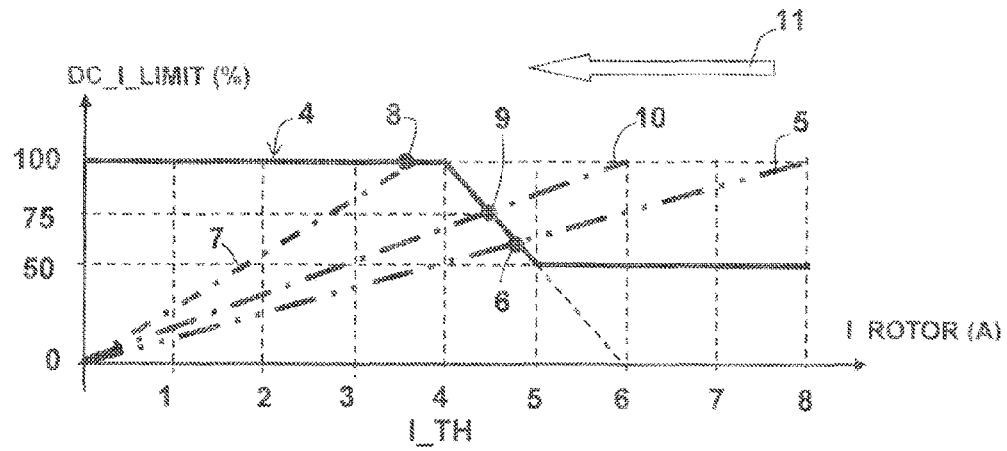
FIG. 4 is a graph showing a third limitation of the duty cycle in relation to excitation current and temperature according to the invention.

A third limitation of the duty cycle DC_I_LIMIT as a function of the excitation current I_ROTOR is defined by a limiter 4 which is preset as shown in FIG. 4.

Excitation limitation only occurs after a preset current threshold I_TH. The resistant torque C proportional to the excitation current I_ROTOR is as a consequence limited to being above this threshold I_TH.

Figure 5:
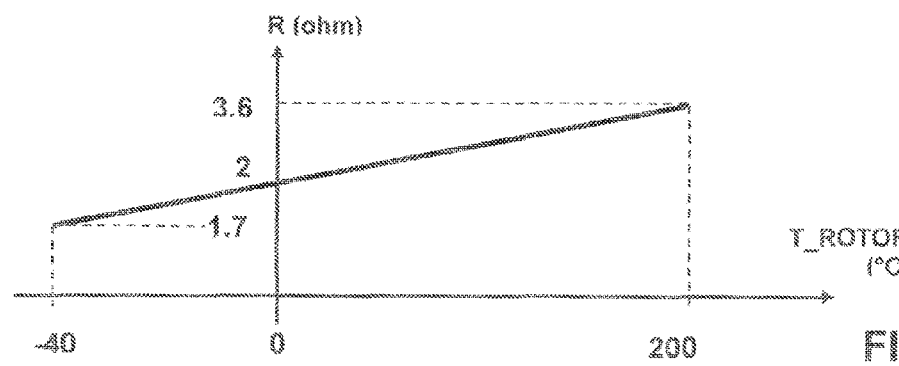
FIG. 5 shows the change in the resistance of a rotor of an alternator for which the invention is intended as a function of temperature.

As shown in FIG. 5, when cold, the rotor has a low resistance R, for example 1.7 ohm at a T_ROTOR temperature of −40° C.

The excitation current I_ROTOR varies linearly with the duty cycle (a variation represented by the first straight line 5 for this T_ROTOR temperature of −40° C.) and becomes a maximum, as clearly shown in FIG. 4. It can therefore for example reach 8 A when the duty cycle is 100% in the absence of limitation.

The excitation current is higher than the current threshold I_TH (4 A, as shown for example in FIG. 4), and the third duty cycle limitation DC_I_LIMIT acts at a first functioning point 6 which is the intersection between preset limiter 4 and first straight line 5.

As shown in FIG. 5, when hot the rotor has a higher resistance R, for example 3.6 ohm at a T_ROTOR temperature of 180° C.

A second straight line 7, which represents the change in the excitation current I_ROTOR in relation to a duty cycle for that T_ROTOR temperature of 180° C. intersects preset limiter 4 and a second functioning point 8 below the current threshold I_TH, corresponding for example to an excitation current of 3.8 A: the third duty cycle limitation DC_I_LIMIT does not act when hot.

For an ordinary intermediate T_ROTOR temperature, an ordinary operating point 9, corresponding to the intersection between a current straight line 10 representing the excitation current I_ROTOR in relation to a duty cycle for this ordinary T_ROTOR temperature varies according to the extent to which the rotor is heated up 11.

According to this first variant of the process according to the invention the third duty cycle limitation DC_I_LIMIT is combined with the first duty cycle limitation SPEED_LIMIT in relation to the rotation speed of the alternator (as shown in FIG. 1a) to determine the maximum duty cycle DC_LIMIT.

Preferably this maximum duty cycle DC_LIMIT is equal to the larger of the first and third duty cycle limitations:

$$DC\_LIMIT = MAX(SPEED\_LIMIT, DC\_I\_LIMIT)$$

Measurements made for this first variant on the prototype alternator have shown that
- the resistant torque C is effectively limited for a strong excitation current at a low speed V;
- there is little limitation of the resistant torque C when the rotor is hot.

In a second variant of the process for controlling the resistant torque C of a motor vehicle alternator according to the invention a maximum duty cycle DC_LIMIT is determined on the basis of a rotor rotation speed V_ROTOR, an excitation current I_ROTOR and a feed voltage B+:

$$DC\_LIMIT = f(V\_ROTOR, I\_ROTOR, B+)$$

In order to achieve this a fourth duty cycle limitation DC_C_LIMIT comes into play if an estimate of the torque C_TA of the resistant torque C in relation to the rotor rotation speed V_ROTOR, the excitation current I_ROTOR and the feed voltage B+ is greater than a preset torque threshold C_TH.

If the estimate of the torque C_TA made by a function known as "TORQUE ASSIST" is greater than the preset torque threshold C_TH, the maximum duty cycle DC_LIMIT is equal to the fourth duty cycle limitation DC_C_LIMIT.

In this case this fourth duty cycle limitation DC_C_LIMIT prevails over a control value prepared by a loop regulating voltage B+.

If the estimate of torque C_TA is less than the preset threshold C_TH, there is no limitation of the duty cycle, which is controlled normally by the regulating loop to maintain the system voltage at the set value.

Figure 6:
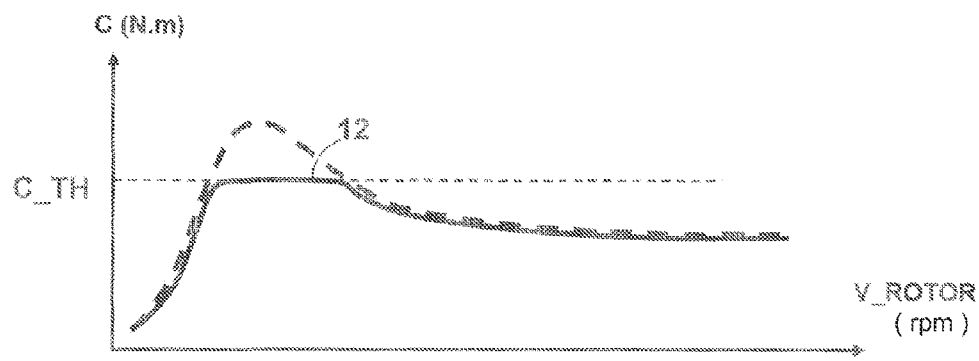
FIG. 6 shows the effect on the torque drawn of applying limitation to the duty cycle according to the second variant of the process according to the invention.

FIG. 6 clearly shows the effect of implementing this second variant of the process for controlling the resistant torque C of an alternator in the case where electrical loads increase when slowing down: the torque drawn shows a leveling off 12 at a level equal to the fixed torque threshold C_TH.

Figure 7:
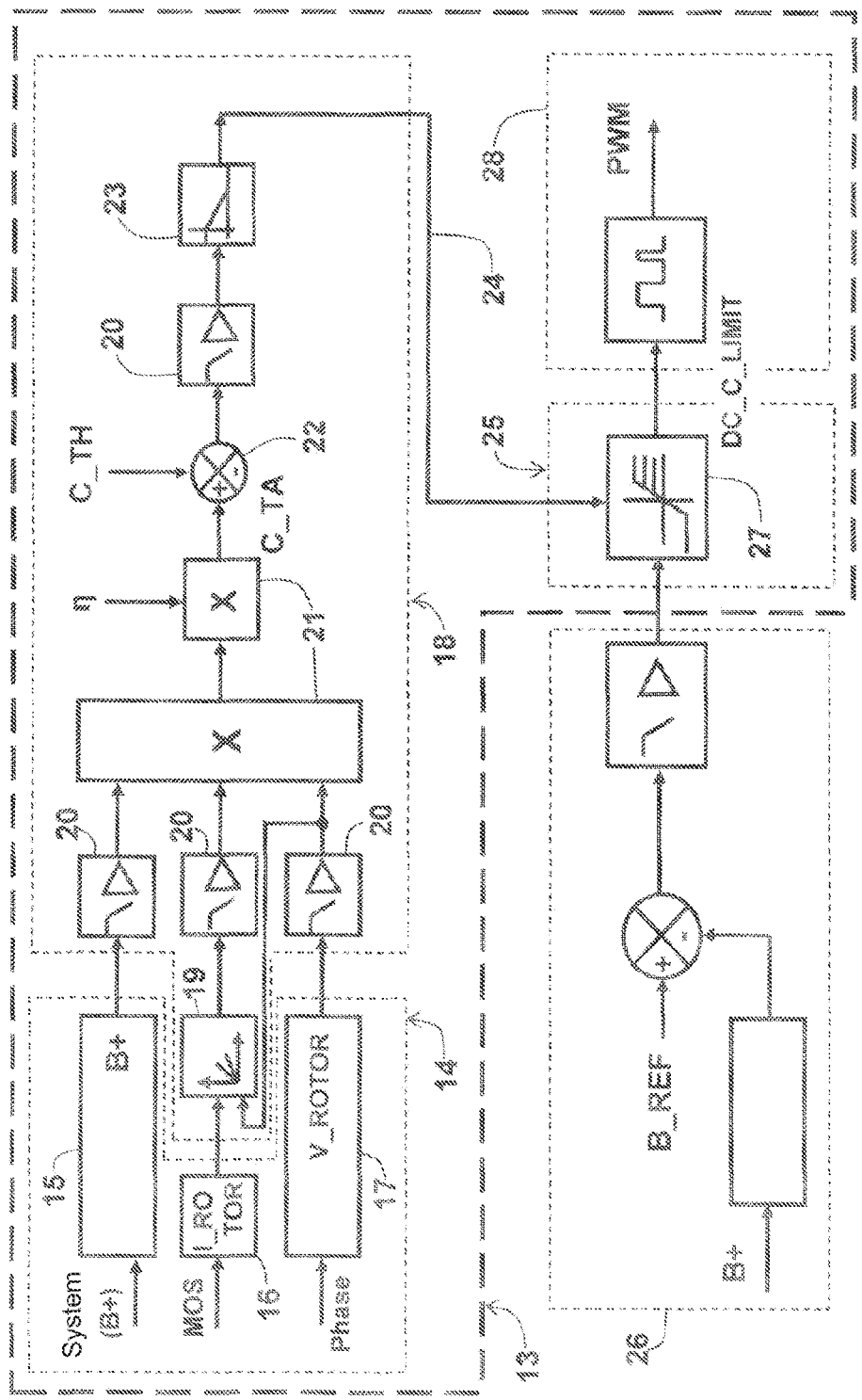
FIG. 7 is an outline diagram of a preferred embodiment of a system for controlling the resistant torque of a motor vehicle alternator according to the invention capable of implementing the second variant of the process.

As the process according to the invention in its general principle takes into account at least two variables which are representative of the functioning of the alternator to determine a maximum duty cycle DC_LIMIT, the control system 13 of a corresponding resistant torque C comprises the means necessary to measure these variables, as shown in FIG. 7.

The outline diagram in FIG. 7 is more specifically that of a control system 13 for a resistant torque C which can be implemented in the second variant of the process according to the invention.

This control system 13 comprises the three measurement means 14 for the three variables taken into account in this second variant:
- means for measuring feed voltage 15 by measuring the feed voltage B+ for the on-board system;
- means for measuring the excitation current 16 measuring the excitation current I_ROTOR when the MOS switching semiconductor unit is in the passing state;
- means for measuring rotation speed 17 which measure the rotation speed V_ROTOR of the alternator on the basis of the phase current.

The results for the B+, I_ROTOR and V_ROTOR measurements provided by measurement means 14 are processed by a torque estimating unit 18 comprising several processing units:
- an alternator mapping unit 19 (preset table or polynomial function);
- amplifiers and filters 20;

multipliers 21 combining the amplified and filtered measured results to provide an estimated torque C_TA;

a subtractor 22 preparing a torque error, the difference between the preset torque threshold C_TH and the estimated torque C_TA;

a binary word length adaptor 23.

Output 24 from torque estimator unit 18 is applied to an excitation limitation control unit 25.

This excitation limiting control unit 25 limits the variable duty cycle reduced by pre-existing alternator voltage regulator 26 to a maximum duty cycle DC_C_LIMIT through a duty cycle limitation limiter 27 when the estimated torque C_TA is greater than the torque threshold C_TH.

Thus signal generator 28 controlling the excitation current provides PWM signals for the variable duty cycle determined by voltage regulator 26 in such a way as to maintain the feed voltage B+ at the set voltage B_REF when the estimated torque C_TA is less than the torque threshold C_TH, and PWM signals provide a maximum duty cycle DC_C_LIMIT when a major load on the on-board electrical system would if it were not controlled give rise to a drawn torque greater than the torque threshold C_TH.

The measured results for B+, I_ROTOR and V_ROTOR can be processed by torque estimating unit 18 and excitation limiting control unit 25 through a program using additional routines advantageously implemented in the memories of the microprocessors or microcontrollers which comprise modern standard alternator regulation devices. This processing may also be implemented through digital logic (of the ASIC type) or programmable logic (FPGA, CPLD).

Obviously the invention is not limited to merely the preferred embodiments described above.

In particular, consideration of variables representative of the functioning of the alternator other than those indicated above, and determination of a maximum duty cycle DC_LIMIT through combinations or functions other than those specified, would only constitute variant embodiments, even if they were more effective.

These other embodiments would not go beyond the scope of this invention insofar as they are covered by the following claims.

The invention claimed is:

1. Process for controlling a resistant torque (C) of a motor vehicle alternator intended to be coupled to an internal combustion engine of a vehicle and capable of producing a feed voltage (B+) for a system on board the said vehicle in response to an excitation current (I_ROTOR) applied to a rotor of said alternator, the said process comprising limiting said resistant torque (C) by determining a maximum duty cycle (DC_LIMIT) for the excitation current (I_ROTOR) in relation to variables taken from a group comprising a rotation speed (V_ROTOR) of said rotor, a temperature (T_ROTOR) of said rotor, said excitation current (I_ROTOR) and said feed voltage (B+) being characterised in that the wherein said maximum duty cycle (DC_LIMIT) is determined as a function of at least said rotation speed (V_ROTOR) and said temperature (T_ROTOR), said maximum duty cycle (DC_LIMIT) being equal to a linear function of said temperature (T_ROTOR) having a gradient which is inversely proportional to said rotation speed (V_ROTOR).

2. Process for controlling the resistant torque (C) of a motor vehicle alternator according to claim 1, characterized in that said temperature (T_ROTOR) is estimated as a function of a measurement of the temperature of a regulator for said voltage (B+), preferably the temperature at a junction to a semiconductor unit (MOS) switching said excitation current (I_ROTOR).

3. System (13) for controlling a resistant torque (C) of a motor vehicle alternator capable of implementing the process according to claim 1, said alternator being designed to be coupled to an internal combustion engine of a vehicle and producing a feed voltage (B+) for a system on board said vehicle in response to an excitation current (I_ROTOR) flowing in a rotor of said alternator, said system (13) being of the type of those comprising limiting said resistant torque (C) and comprising:

a signal generator (28) controlling said excitation current (I_ROTOR) and having a variable duty cycle equal to not more than a maximum duty cycle (DC_LIMIT);

measurement means (14) from among a first group comprising means for measuring the rotation speed (17) of said rotor, means for measuring the temperature of said rotor, means for measuring the excitation current (16) and means for measuring the feed voltage (15); and means (18, 25) for determining said maximum duty cycle (DC_LIMIT) from the measured results provided by said measurement means (14);

characterized in that said determining means (18, 25) determine said maximum duty cycle (DC_LIMIT) as a function of at least said rotation speed (V_ROTOR) and said temperature (T_ROTOR), this said maximum duty cycle (DC_LIMIT) being equal to a linear function of said temperature (T_ROTOR) which has a gradient inversely proportional to said rotation speed (V_ROTOR).

4. System (13) for controlling the resistant torque (C) of a motor vehicle alternator according to claim 3, characterized in that said determining means (18, 25) also comprise a torque estimating unit (18) and an excitation limiting control unit (25).

5. System (13) for controlling the resistant torque (C) of a motor vehicle alternator according to claim 4, characterized in that said torque estimating unit (18) comprises at least one processing unit from a second group comprising an amplifier (20), a filter (20), a multiplier (21), a mapper (19), a subtractor (22) and a binary word length adaptor (23), and in that said excitation limitation control unit (25) comprises a limiter limiting the duty cycle (27).

6. System (13) for controlling the resistant torque (C) of a motor vehicle alternator according to claim 3, characterized in that said determining means (18, 25) further comprise a memory function comprising instructions representative of the process according to preceding claim 1.

7. Motor vehicle alternator comprising a system (13) for controlling a resistant torque (C) according to claim 3.

* * * * *